United States Patent [19]
Kimura et al.

[11] 3,885,961
[45] May 27, 1975

[54] POLYMERIC BINDER MATERIAL FOR USE IN A PHOTOCONDUCTIVE LAYER EMPLOYED IN ELECTROPHOTOGRAPHY

[75] Inventors: Tadasu Kimura, Tokyo; Tomozo Uchiyama; Thuneo Kochi, both of Ohtake, all of Japan

[73] Assignee: Mitsubishi Rayon Company, Ltd., Tokyo, Japan

[22] Filed: Aug. 1, 1972

[21] Appl. No.: 277,061

[52] U.S. Cl.................. 96/1.5; 96/1.8; 260/78.4 R
[51] Int. Cl.............................................. G03g 5/08
[58] Field of Search................................ 96/1.8, 1.5

[56] References Cited
UNITED STATES PATENTS

| | | | |
|---|---|---|---|
| 3,245,786 | 4/1966 | Cassiers et al. | 96/1.8 X |
| 3,481,735 | 12/1969 | Graver et al. | 96/1.8 X |
| 3,585,027 | 6/1971 | Shimizu | 96/1.5 |
| 3,640,709 | 2/1972 | Kondo et al. | 96/1.8 X |
| 3,704,122 | 11/1972 | Yamaguchi et al. | 96/1.8 |
| 3,707,402 | 12/1972 | Yamaguchi et al. | 117/201 |
| 3,732,096 | 5/1973 | Honjo et al. | 96/1.5 |
| 3,761,259 | 9/1973 | Arai et al. | 96/1.8 |
| 3,793,021 | 2/1974 | Yamaguchi et al. | 96/1.5 |

FOREIGN PATENTS OR APPLICATIONS

| | | | |
|---|---|---|---|
| 1,141,282 | 1/1969 | United Kingdom | 96/1.8 |
| 44-17316 | 7/1969 | Japan | 96/1.5 |
| 1,020,506 | 2/1966 | United Kingdom | 96/1.8 |

*Primary Examiner*—Norman G. Turchin
*Assistant Examiner*—John R. Miller
*Attorney, Agent, or Firm*—Armstrong, Nikaido & Wegner

[57] ABSTRACT

A photosensitive material for electrophotography composed of a substrate material, which has been made electrically conductive, and a photoconductive layer provided thereon, the photoconductive layer being formed from a resin composition consisting essentially of:
a. a photoconductive powder, and
b. a binder which comprises a mixture of:
1. polymer [A] having a glass transition temperature of $-20°$ to $100°C$, and a mean molecular weight $MW_1$, of $500 \leq MW_1 \leq 5000$; and containing a structural unit represented by the following formulas [I] or [II], the $-OOCR_3COOH$ content in said formulas being 0.5–90 percent by weight, based on the weight of polymer [A]:

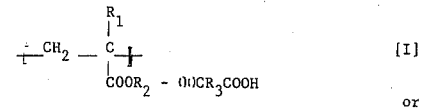

or

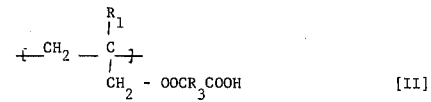

wherein $R_1$ is hydrogen or methyl, $R_2$ is an alkylene radical of 2–8 carbon atoms, a polyethylene glycol residue having 10 or less recurring units or a polypropylene glycol residue having 10 or less recurring units, and $R_3$ is and $R_3$ is

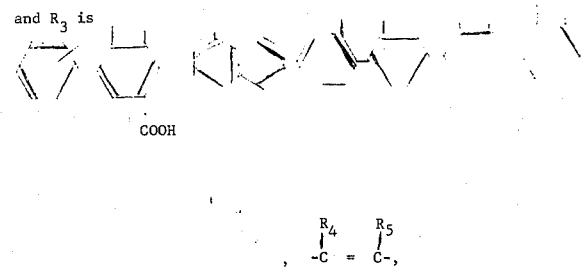

wherein $R_4$ and $R_5$ are hydrogen or alkyl of 1–4 carbon atoms, or

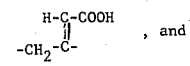 , and 2. polymer [B] having a glass transition temperature of $0°$ to $60°C$ and a mean molecular weight $MW_2$ of $5000 \leq NW_2 \leq 50,000$ and greater than that of $MW_1$; and containing 60 percent by weight or less of structural units represented by said formulas [I] or [II] and at least 30 percent by weight of the structural units being represented by the following formula [III]:

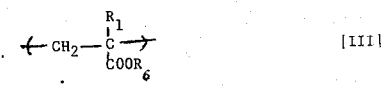

where $R_1$ is the same as defined above and $R_6$ is straight or branched chain alkyl of 1–12 carbon atoms, cycloalkyl or benzyl;
said binder containing 0.5–60 percent by weight of structural units of the formula $-OOCR_3COOH$.

4 Claims, 3 Drawing Figures

POLYMERIC BINDER MATERIAL FOR USE IN A PHOTOCONDUCTIVE LAYER EMPLOYED IN ELECTROPHOTOGRAPHY

This invention relates to photosensitive materials for electrophotography, particularly to those having remarkable characteristic properties such as excellent surface charge and charge decay characteristics and a stable image-forming property which is undistrubed even when a change in humidity takes place and showing little deterioration even if its photoconductive layer has been exposed to light prior to the image formation.

As a binder which has been conventionally used in forming the photoconductive layer of a photosensitive material for electrophotography, there are known silicone resins, alkyd resins and acrylic resins having a carboxyl group. A photosensitive material with a photoconductive layer formed by use of, as a binder, a relatively low molecular weight silicone resin among the above-named resins has excellent characteristic properties such as satisfactory surface charge and charge decay characteristics and non-deterioration in photosensitive characteristics even when exposed to high temperatures. However, such a photosensitive material has serious defects such as poor solvent resistance, which is a problem in practical use, and a high price. On the other hand, a photosensitive material obtained by using conventional acrylic polymers containing a carboxyl group or alkyd resins as a binder to form the photoconductive layer has not yet attained surface charge and charge decay characteristics and an image-forming property sufficient for practical use, and has other defects such as fluctuation in image-forming property due to change in atmospheric humidity and deterioration in image-forming property when the photoconductive layer has been exposed to light prior to the image formation. Improvements in these properties have been desired.

As a result of investigations on preparation of a photosensitive material in which the above-mentioned properties are greatly improved, the present inventors have accomplished this invention.

This invention provides a photosensitive material for electrophotography, characterized in that it comprises a photoconductive layer formed from a resin composition consisting essentially of a photoconductive powder and a binder component consisting of an organic resin which contains a structural unit represented by the formula [Z]:

$$-O-\overset{O}{\overset{\|}{C}}-R_3-\overset{O}{\overset{\|}{C}}-OH$$

wherein $R_1$ represents at least one radical selected from the group consisting of in which $R_4$ and $R_5$ represent hydrogen atoms or alkyl radicals of 1 to 4 carbon atoms, and the amount of said structural unit of the formula [Z] contained in said binder being 0.5 to 60 percent by weight.

The binder for use in this invention is required to contain 0.5 to 60 percent by weight of a structural unit represented by the general formula [Z]. When the amount of said structural unit is less than 0.5 percent by weight, the surface charge and charge decay characteristics and the image-forming property of the resulting photoconductive layer becomes markedly inferior. On the other hand, a binder containing more than 60 percent by weight of said structural unit has a high viscosity, and hence, is somewhat inferior in coating working, and a photosensitive material prepared from the binder is low in sensitivity though has good surface charge and charge decay characteristics. Therefore, it is difficult to form a sharp image by use of the above photosensitive material. Further, the binder becomes expensive.

For introducing the structural unit represented by the formula [Z] into the binder component, the following methods may be adopted to prepare monomers for the preparation of polymer [A] of the formulas [I] and [II]:

a. A method whereby a polybasic carboxylic acid anhydride represented by the formula [I], wherein $R_3$ has the same meaning as defined above, undergoes addition reaction with a hydroxyl-containing organic polymer which is a copolymer of an aromatic vinyl monomer such as styrene, α-methylstyrene or α-chlorostyrene, and/or an alkyl ester of an α, β-ethylenically unsaturated carboxylic acid, with a hydroxyl-containing vinyl monomer such as allyl alcohol, methallyl alcohol or a hydroxyalkyl ester of an α, β-ethylenically unsaturated carboxylic acid.

b. A method whereby a hydroxyl-containing vinyl monomer such as allyl alcohol, methallyl alcohol, or a hydroxyalkyl ester of an α, β-ethylenically unsaturated carboxylic acid undergoes addition reaction with a polybasic carboxylic acid anhydride represented by the formula [1], and the addition reaction product is then copolymerized with an aromatic vinyl monomer such as styrene, α-methylstyrene or α-chlorostyrene, and/or an alkyl ester of an α, β-ethylenically unsaturated carboxylic acid.

c. The same method as that of (a) or (b), except that a glycidyl-containing vinyl monomer such as glycidyl acrylate or methacrylate, glycidyl allyl or methallyl ether or the like is substituted for the hydroxyl-containing vinyl monomer, and a polybasic carboxylic acid represented by the formula [2],

[2]

wherein $R_1$ has the same meaning as defined above, is substituted for the polybasic carboxylic acid anhydride represented by the formula [1].

The hydroxyl-containing vinyl monomer for use in preparing the binder necessary in practising this invention include allyl alcohol, methallyl alcohol, hydroxyalkylacrylamides or methacrylamides, and the monomers represented by the following formulas [3], [4] and [5]:

[3]

wherein $R_1$, $R_8$ and $R_9$ represent hydrogen atoms or methyl radicals, and $R_7$ represents in which $R_8$ is a hydrogen atom or a methyl group, and $n$ and $m$ are integers of 1 to 10;

[4]

wherein $R_7$, $R_8$ and $R_9$ have the same meanings as defined above and $l$ is 1 or 2;

[5]

wherein $R_7$, $R_8$ and $R_9$ have the same meanings as defined above, and $R_{10}$ represents a hydrogen atom or an alkyl radical of 1 to 12 carbon atoms.

The vinyl monomers represented by the formula [3] may be obtained through monoester exchange reaction between acrylic acid or methacrylic acid and a diol such as ethylene glycol, propylene glycol, 1,3-butylene glycol, 1,4-butylene glycol, 1,6-hexylene glycol, or 2-ethylhexylene glycol or a polyethylene glycol or polypropylene glycol.

The vinyl monomers of the formula [4] may be obtained by monoester exchange reaction of itaconic acid, α-methyleneglutaric acid, or anhydride thereof with an above-mentioned diol, polyethylene glycol, or polypropylene glycol.

The vinyl monomers of the formula [5] may be obtained through monoester exchange reaction between maleic acid or its anhydride and a diol, polyethylene glycol, or polypropylene glycol as mentioned above.

Examples of the polybasic acids and their anhydrides of the formulas [1] and [2] are phthalic acid and its anhydride, isophthalic acid, terephthalic acid, trimellitic acid and its anhydride, naphthalic acid and its anhydride, diphenic acid and its anhydride, isodiphenic acid, biphenyl-4,4'-dicarboxylic acid, citraconic acid and its anhydride, pyrocinchonic acid and its anhydride, ethylmaleic acid and its anhydride, maleic acid and its anhydride, fumaric acid, aconitic acid and its anhydride, tetrahydrophthalic acid and its anhydride, etc.

The alkyl esters of α, β-ethylenically unsaturated carboxylic acids are obtained by reaction of acrylic acid or methacrylic acid with a monohydric alcohol such as methanol, ethanol, propanol, n-butanol, tert-butanol, isopropanol, hexanol, 2-ethylhexanol, cyclohexanol, lauryl alcohol, stearyl alcohol, or the like.

Further, vinyl monomers copolymerizable with the above esters, such as vinyl acetate, vinyl propionate, acrylonitrile, methacrylonitrile, α-methyleneglutaronitrile, vinyl chloride, benzyl acrylate or methacrylate, can be used as a comonomer in preparing the binder.

The photoconductive layer can be further improved in film characteristics such as solvent resistance, alkali resistance and acid resistance and in sharpness of the image-forming by introducing into the binder for use in this invention at least 30 percent by weight of a structural unit of the following formula [III]:

[III]

wherein $R_1$ is the same as defined above, and $R_6$ represents a radical selected from straight or branched chain alkyl of 1 to 12 carbon atoms, cycloalkyl or benzyl.

In preparing the binder for use in practicing this invention, it is necessary to form a polymer [A] containing the structural unit of the formula [Z] and having a mean molecular weight of 500 to 50,000 according to the aforementioned method (a), (b) or (c). A photoconductive layer formed by use of a polymer having a mean molecular weight of less than 500 is inferior in moisture resistance, chemicals resistance and binder ability (ability to stably maintain the photoconductive powder in the photoconductive layer of the photosensitive material), while a photoconductive layer formed by use of a polymer having a mean molecular weight of greater than 50,000 tends to show deteriorated surface charge and charge decay characteristics. Therefore, the mean molecular weight of the said polymer is preferably within the range of 500 to 50,000.

When the polymer formed according to the method (a), (b) or (c) is used alone to form a binder, the mean molecular weight of the polymer is preferably kept within the range of 5,000 to 50,000 in order to prevent deterioration in moisture resistance, solvent resistance and chemicals resistance of the photoconductive layer. In these cases, it is also possible to produce a photosensitive material for electrophotography, which is excellent in image-forming characteristics and is capable of forming a sharp image, by adjusting the composition of the polymer so as to contain in the polymer 0.5 to 60 percent by weight of the structural unit of the formula [Z] and at least 30 percent by weight of the structural unit of the formula [III].

When polymer [A] obtained by the method (a), (b) or (c), which has a mean molecular weight of 500 to 5,000 is used alone to form a binder and the resulting binder is used to produce a photoconductive layer, there occurs, in some cases, deterioration in moisture resistance, solvent resistance and chemicals resistance. In such cases, therefore, it is necessary to mix the polymer [A] containing 0.5 to 90 percent by weight of the structural unit of the formula [Z] and which has a mean molecular weight of 500 to 5,000 with a polymer [B], an alkyd resin, polyester resin, acryl-modified polyester resin, acrylated alkyd resin, or acrylic resin, each having a mean molecular weight of 5,000 to 50,000, so that the content of structural unit of the formula [Z] may become 0.5 to 60 percent by weight. The polymer [A] of a mean molecular weight of 500 to 5,000 for use in these cases has preferably a glass transition temperature of −20° to +110°C. If a polymer [A] having a glass transition temperature of lower than −20°C. is used as a constituent of the binder, the resulting binder will give a photosensitive material for electrophotography which shows tackiness and deterioration in the image-forming performance. On the other hand, if a polymer [A] having a glass transition temperature higher than 110°C. is used as a constituent of the binder, the photosensitive material produced from said binder tends to show curling. The polymer [B] of a mean molecular weight of 5,000 to 50,000 for use in these cases has preferably a glass transition temperature of 0° to 60°C. In a binder formed from a combination of two or more polymers having different molecular weights as mentioned above, the polymer of higher molecular weight, i.e. the polymer [B] of a molecular weight of 5,000 to 50,000, constitutes the major component. Accordingly, if a polymer [B] having a molecular weight of 5,000 to 50,000 and a glass transition temperature lower than 0°C. is used as a constituent of the binder, the resulting binder will give a photosensitive material for electrophotography which shows tackiness and deterioration in surface charge and charge decay characteristics. On the other hand, a photosensitive material for electrophotography produced by using a binder containing as a constituent a polymer [B] of a mean molecular weight of 5,000 to 50,000 which has a glass transition temperature higher than 60°C. tends to show curling. When a binder is prepared by using together a polymer [A] having the above-mentioned characteristics and a mean molecular weight of 500 to 5,000 and a polymer [B] having a mean molecular weight of about 5,000 to 50,000, such as alkyd resin, polyester resin, acryl-modified polyester resin, acrylated alkyd resin or acrylic resin, the photoconductive layer of a photosensitive material prepared from the thus obtained binder has better resistance to solvent, moisture and chemicals. The polymer [B] having a mean molecular weight of about 5,000 to 50,000 referred to above does not necessarily contain the structural unit of the formula [Z]. However, when said polymer contains up to 60 percent by weight of the structural unit of the formula [Z], the adhesiveness of the binder to a substrate is better. A photosensitive material prepared from the binder obtained from a combination of the polymer [A] having a mean molecular weight of 500 to 5,000 and the polymer [B] having a mean molecular weight of 5,000 to 50,000 is superior in light decay and dark decay and enables the enhancement of the sharpness of image.

Examples of the polymers [A] having a mean molecular weight of 500 to 5,000 and containing 0.5 to 90 percent by weight of the structural unit of the formula [Z] are: an addition polymer formed from a copolymer of styrene-allyl alcohol and an acid anhydride of the formula [1]; and an addition polymer formed from an acid anhydride of the formula [1] and a polymer composed of 10 to 40 percent by weight of a monohydroxyalkyl ester of an $\alpha$, $\beta$-ethylenically unsaturated carboxylic acid, 30 to 90 percent by weight of an acrylic monomer, and 60 percent by weight or less of other comonomers.

Preparation of a binder for use in this invention the method (b) is carried out most effectively according to the following procedure:

Firstly, a hydroxyalkyl ester of an $\alpha$, $\beta$-ethylenically unsaturated carboxylic acid and an acid anhydride represented by the formula [1] (molar ratio, 1 : 1) are allowed to undergo addition reaction to obtain an unsaturated monomer having a structural unit of the formula [Z], which is referred to as $M_1$ monomer. Another vinyl monomer, which is copolymerizable with the $M_1$ monomer and is used in preparing a binder, is referred to as $M_2$ monomer. 10 to 30 percent by weight of the total $M_1$ monomer and 70 to 90 percent by weight of the total $M_2$ monomer are charged in a polymerizer and allowed to polymerize. When the conversion reached more than about 50 percent, the remaining $M_1$ monomer and $M_2$ monomer are added to continue the polymerization. The resin composition thus obtained is an extremely homogeneous mixture comprising a relatively low molecular polymer containing a major amount of structural units of the formula [Z], and a high molecular polymer containing a minor amount of structural units of the formula [Z]. Therefore, a photosensitive material for electrophotography produced by using said resin composition as a binder is favorable in surface charge and charge decay characteristics and image-forming performance, particularly in gradation of half tone.

Examples of most preferable $M_1$ monomers are the compounds enumerated below.

—Continued

In the method (a), (b) or (c), the addition reaction between the hydroxyl group and the acid anhydride of the formula [1] and that between a glycidyl group and a carboxylic acid of the formula [2] can be carried out in the presence or absence of a catalyst. Compounds for use as the catalyst are basic substances such as triethylamine, trilaurylamine, diethylaminomethyl acrylate or methacrylate, dimethylaminoethyl acrylate or methacrylate, vinylpyridine, and triethylbenzylammonium chloride.

The addition reaction between a hydroxyl group and an acid anhydride of the formula [1] and that between a glycidyl group and a carboxylic acid of the formula [2] in the method (a), (b) or (c) should be conducted so that the concentration of the free carboxylic acid of the formula [1] or [2] in the binder will be 10 percent by weight or less. If the amount of a free carboxylic acid or an anhydride thereof remained in the binder exceeds 10 percent by weight, the photosensitive material for electrophotography produced from such a binder will be susceptible to undesirable fogging. However, a photosensitive material for electrophotography produced from a binder containing 0.01 to 10 percent by weight of the said free carboxylic acid may be improved in surface charge and charge decay characteristics and in the image density. Accordingly, 0.01 to 10 percent by weight of a free carboxylic acid of the formula [1] or [2] can be added to a binder obtained by the method (a), (b) or (c).

The photoconductive powders for use in this invention include zinc oxide and cadmium sulfide which may be used, if necessary, jointly with sensitizing dyes such as Rose Bengal, Bromophenol Blue, Auramine, etc.

In practising this invention, a photoconductive powder such as zinc oxide or cadmium sulfide and, if necessary, a sensitizing dye such as Rose Bengal are added to the solution of a polymer containing 0.5 to 60 percent by weight of structural units of the formula [Z]; the resulting composition is coated on a substrate material such as paper or a plastic film, which has been treated to impart conductivity, and then dried.

In the attached drawings.

The invention is illustrated below in further detail with reference to examples, but the invention is not limited to those examples. All parts and percentages in the examples are by weight.

EXAMPLE 1

46.8 Parts of 2-hydroxyethyl methacrylate, 53.2 parts of phthalic anhydride, 0.5 part of triethylamine, 0.01 part of hydroquinone monomethyl ether, and 100 parts of toluene are mixed and allowed to react at 100°C. for 8 hours to obtain a toluene solution containing a monomer represented by the following formula:

The conversion in the addition reaction is 93 percent. 81 Parts of the toluene solution obtained above, 112.5 parts of styrene, 448 parts of n-butyl methacrylate, 480 parts of toluene, and 1.8 parts of azobisisobutyronitrile are mixed and heated at 80°C. to polymerize. Each 3.0 parts of azobisisobutyronitrile are added after 2 hours and 3 hours. Each 5.0 parts of azobisisobutyronitrile are added after 5 hours and 6.5 hours to continue the polymerization and 384 parts of toluene is added after 8.5 hours to complete the polymerization.

The end product is a toluene solution of a polymer containing about 3.0 percent of a structural unit of the following formula:

The said solution has an acid value of 4.7, the solid content being 39.8 percent. The mean molecular weight of the polymer formed is about 12,000, a glass transition temperature of about 34°C.

25 Parts of the resin solution obtained above, a mixture of 0.010 part of Rose Bengal, 0.015 part of Bromophenol Blue, 0.050 part of Auramine, 2.0 parts of methanol and 64 parts of toluene, and 60 parts of zinc oxide powder are milled in a ball mill for 5 hours to obtain a resin composition. This resin composition is coated on a paper, which has been made conductive, to a thickness of 10μ in terms of dry film, and then dried to obtain a photosensitive material for electrophotography (1) of this invention. For comparison, 19.6 parts of styrene, 78.7 parts of n-butyl methacrylate, 1.7 parts of acrylic acid, and 150 parts of toluene are polymerized in a manner similar to that mentioned above. The resin solution obtained has an acid value of 4.1, a glass transition temperature of about 34°C, and a molecular weight of about 12,000, the solid content being 40 percent. This resin solution, zinc oxide powder, Rose Bengal, Bromophenol Blue, and Auramine are mixed to obtain a resin composition. The resin composition is coated on a paper, which has been made conductive, and dried to produce a photosensitive material for electrophotography (2).

In a manner similar to that mentioned above, photosensitive materials for electrophotography (3), (4) and (5) are produced by using as the resin solution a styrenated alkyd resin solution, a vinylidene chloride/vinyl chloride resin solution and an epoxy ester resin solution, respectively.

Figure 1:
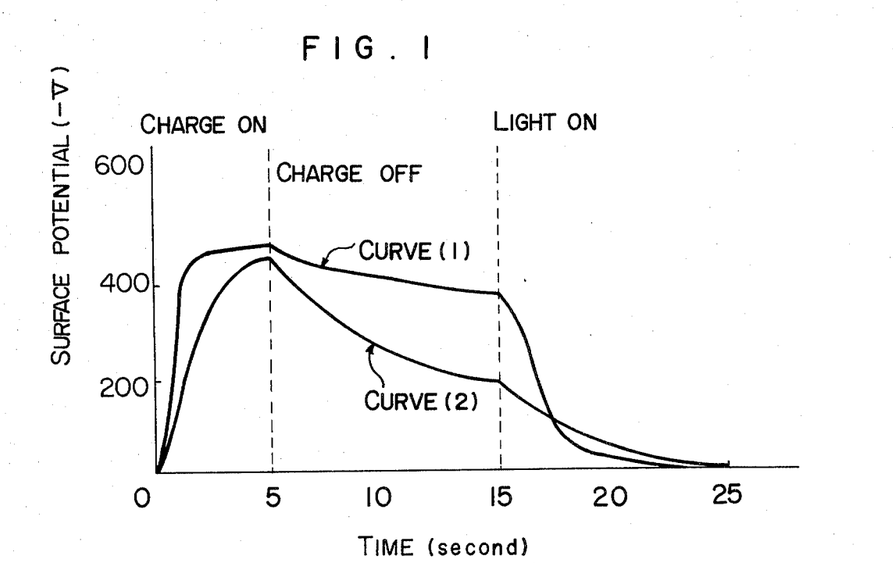
FIG. 1 shows characteristic curves for charged photoconductive layers of two photosensitive materials for electrophotography, one of which is an example of this invention and the other is that of conventional one.

Photoconductive layers of the thus obtained photosensitive materials (1), (2), (3), (4) and (5) are subjected to a corona discharge at a potential of –6 KV. After 5 seconds from the start of discharge, the corona discharge is discontinued and the potential $V_0$ of the photoconductive layer at this instant is taken as an initial potential. After the charged photosensitive material has been left in the dark for 10 seconds, the potential $V_{10}$ of the photoconductive layer is measured to obtain the percentage residual potential $V_{10}/V_0$ (dark decay). Subsequently, the photosensitive material is exposed to a 30-lux light and the time $E_{20}$ (light decay) required for the potential of the photoconductive layer to decrease to 20 V is measured. The results obtained are shown in Table 1. The instrument used in determining these surface charge and charge decay characteristics is Electrostatic Paper Analyzer, Model SP-428, manufactured by Kawaguchi Electric Works Co. The measurement is by a dynamic method in all cases. The surface charge and charge decay characteristic curves for the photoconductive layers of the photosensitive materials (1) and (2) obtained from the measurements as mentioned above are shown in FIG. 1 (see curves (1) and (2), respectively).

Table 1

| Item of measurements | | Percentage | |
|---|---|---|---|
| Electrographic sensitive material No. | Initial potential, $V_0$, -V | residual potential, $V_{10}/V_0$, % | Light decay, $E_{20}$, sec. |
| (1) This invention | 480 | 79 | 5.0 |
| (2) Comparative example | 460 | 39 | 8.0 |
| (3) " | 300 | 44 | 9.0 |
| (4) " | 142 | 10 | — |
| (5) " | 330 | 34 | 8.5 |

As is clear from Table 1, the photosensitive material of this invention is very high in both the initial potential and the percentage residual potential and is favorable in light decay, showing excellent surface charge and charge decay characteristics of the present photosensitive material for electrophotography. Further, as is clear from the comparison of the curve (1) with the curve (2) in FIG. 1, the photosensitive material of this invention is excellent also in rapid potential rise in its photoconductive layer after starting of the corona discharge, showing an easy accumulation of the static charge.

From the results of tests regarding the image-forming characteristics of the photosensitive materials (1) and (2), it becomes clear that no fogging is observed in the case of this invention and reproduction of the half-tone is good to form a sharp image, whilst in the case of a photosensitive material for electrophotography (2), which is obtained in Comparative Example, fogging is developed to such a degree that formation of a sharp image is difficult. Further, both of the said photosensitive materials are left for 24 hours under an atmosphere where the humidity is 85 percent and the temperature is 25°C., and afterwards their image-forming characteristics are tested. It is found that the photosensitive material of this invention is hardly affected by moisture, whilst in the case of a reference photosensitive material (2), density of the image is decreased and fogging becomes more pronounced. On the other hand, prior to the formation of image, the said electrophotographic recording materials (1) and (2) are exposed to light of 100,000 lux-seconds and then their image-forming characteristics are examined (pre-exposure test). It is found that the recording material of this invention has not appreciably changed in characteristic properties except for a little reduction in the density of image, whilst in the case of a reference electrophotographic recording material (2), density of the image is reduced to a great extent.

EXAMPLE 2

148.0 Parts of methyl methacrylate, 222.2 parts of ethyl acrylate, 20.0 parts of 2-hydroxyethyl methacrylate, 9.5 parts of dimethylaminoethyl methacrylate, 346 parts of toluene, and 1.2 parts of azobisisobutyronitrile are charged into a polymerizer. After the temperature has been brought to 80°C., the mixture is allowed to polymerize in a manner similar to that mentioned in Example 1. To the polymer solution obtained are added 22.2 parts of phthalic anhydride and 50 parts of toluene. After 8 hours of reaction at 100°C., 120 parts of toluene is added to the reaction mixture to complete the reaction. Conversion in the addition reaction is 70 percent. The resulting resin solution has a non-volatile solid content of 39.5 percent, a glass transition temperature of about 19°C and an acid value of 9.5. The resin has a mean molecular weight of 25,000 and the content of a structural unit of the formula [Z] in the resin was 7.4 percent.

The resin solution obtained is admixed with a zinc oxide powder and the abovesaid sensitizing dyes in a manner similar to that mentioned in Example 1, and then coated on a paper in a manner similar to that in Example 1 to obtain a photosensitive material for electrophotography. Surface charge and charge decay characteristics of said photosensitive materials are tested to obtain the following results: initial potential $V_0$, –435 V; percentage residual potential $V_{10}/V_0$ (dark decay), 82 percent; light decay, $E_{20}$, 6.5 seconds. These results show that the surface charge and charge decay

EXAMPLE 3

25.7 Parts of a compound of the formula, 74.7 parts of styrene, 300.2 parts of n-butyl methacrylate, 200 parts of toluene, and 1.2 parts of azobisisobutyronitrile are mixed in a polymerizer and allowed to polymerize in the same manner as in Example 1 to obtain a resin solution. The content of a structural unit [I] in the resin was 3.1 percent. The resin solution and the zinc oxide powder were mixed in a manner similar to that in Example 1 and the mixed composition is coated on a paper, which has been made conductive, to produce a photosensitive material for electrophotography. In a manner similar to that in Example 1, the photosensitive material for electrophotography obtained above is tested for its image-forming characteristics, moisture resistance, and stability against pre-exposure. All of the results obtained are indicative of favorable characteristic properties of the material.

EXAMPLE 4

747 Parts of the resin solution obtained in EXample 2 and 28.5 parts of trimellitic anhydride are mixed. The resulting resin solution and a zinc oxide powder are mixed in a manner similar to that in Example 1, and the resulting mixture is coated on a paper, which has been made conductive, in a manner similar to that in Example 1 to produce photosensitive material for electrophotography. The photosensitive material produced is tested for its surface charge and charge decay characteristics, image-forming characteristics, moisture resistance, and stability against pre-exposure to obtain the results that are indicative of favorable characteristics.

EXAMPLE 5

Into a polymerizer are charged 462 parts of n-butyl methacrylate, 120 parts of styrene, 18 parts of 2-hydroxyethyl methacrylate, 900 parts of xylene, and 1.8 parts of azobisisobutyronitrile. The mixture is allowed to polymerize in a manner similar to that mentioned in Example 1 to obtain a resin solution, the non-volatile solid content of which is 39.8 percent. The resin has a mean molecular weight of about 12,000, a glass transition temperature of about 30°C., and an acid value of 0.1 or less.

500 Parts of the above resin solution, 4.5 parts of maleic anhydride, 0.1 part of hydroquinone monomethyl ether, and 0.2 part of triethylamine are mixed and allowed to react at 100°C. for 8 hours. The conversion in the above addition reaction is 75 percent. The content of the structural unit [Z] in the resin is 3.4 percent.

In a manner similar to that mentioned in Example 1, the above resin solution and a zinc oxide powder are mixed and the resulting mixture is coated on a paper, which has been made conductive, to obtain a photosensitive material for electrophotography. The surface charge and charge decay characteristics of this photosensitive material are tested to obtain the following results: initial potential $V_0$, $-430$ V; percentage residual potential $V_{10}/V_0$ (dark decay), 85 percent; light decay, $E_{20}$, 7.0 seconds. These results show favorable surface charge and charge decay characteristics. The image-forming characteristics, moisture resistance, and stability against pre-exposure are also excellent, the image obtained having been very sharp and without fogging.

EXAMPLE 6

130.2 Parts of 2-hydroxyethyl methacrylate, 98.1 parts of maleic anhydride, 2.0 parts of triethylamine, and 0.23 part of hydroquinone monomethyl ether are dissolved in 228 parts of toluene and allowed to react at 100°C. for 8 hours to obtain a solution containing 45 percent of a compound of the following formula:

The conversion in the above reaction was 90 percent.

40 Parts of the above reaction solution, 200 parts of methyl methacrylate, 780 parts of n-butyl methacrylate, 1480 parts of toluene, and 2.0 parts of azobisisobutyronitrile are mixed and polymerized in a manner similar to that mentioned in Example 1 to obtain a resin solution. The non-volatile solid content of the resin solution is 40.0 percent, and the resin has a mean molecular weight of about 17,000 and a glass transition temperature of about 35°C.

In a manner similar to that mentioned in Example 1, the resin solution obtained above is mixed with a zinc oxide powder and the resulting mixture is coated on a paper, which has been made conductive, to obtain a photosensitive material for electrophotography. In a manner similar to that in Example 1, the sensitive material thus obtained is tested for its surface charge and charge decay characteristics, image-forming characteristics, moisture resistance, and stability against pre-exposure. The results obtained are indicative of excellent characteristics.

EXAMPLE 7

A photosensitive material for electrophotography is obtained in the same manner as in Example 5, except that 5.8 parts of methylmaleic anhydride is used in place of maleic anhydride. The photosensitive material thus obtained is tested for its surface charge and charge decay characteristics, image-forming characteristics, moisture resistance, and stability against pre-exposure to confirm the excellent characteristics of the sensitive material.

EXAMPLE 8

100 Parts of a styrene/allyl alcohol copolymer ("Polyol RJ-100," produced by Monsanto Co.; hydroxyl value, 178–197; mean molecular weight, 1600; glass transition temperature, about 30°C.), 47 parts of phthalic anhydride, 1.5 parts of triethylamine, and 37 parts of butyl acetate are mixed and allowed to react at 100°C. for 5 hours and then 110 parts of toluene is added to obtain a resin solution (A). The resin has an acid value of 69 and contains 31 percent of the structural unit [Z].

20 Parts of methyl methacrylate, 778 parts of butyl methacrylate, 1 part of acrylic acid, 2.0 parts of azobisisobutyronitrile, 0.2 part of dodecyl mercaptan, and 798 parts of toluene are mixed and polymerized at 80°C. for 80 hours to obtain a resin solution (B) containing 49.8 percent of non-volatile solid content and having an acid value of 3.7.

2 Parts of the above resin solution (A) and 38 parts of the above resin solution (B) are mixed. The content of the structural unit [Z] in the mixture of resins is 1.25 percent. In a manner similar to that in Example 1, the mixed resin solution obtained above and a zinc oxide powder are mixed and the resulting mixture is coated on a paper, which has been made conductive, to obtain a photosensitive material for electrophotography comprising a photoconductive layer of 10µ thickness.

Figure 2:
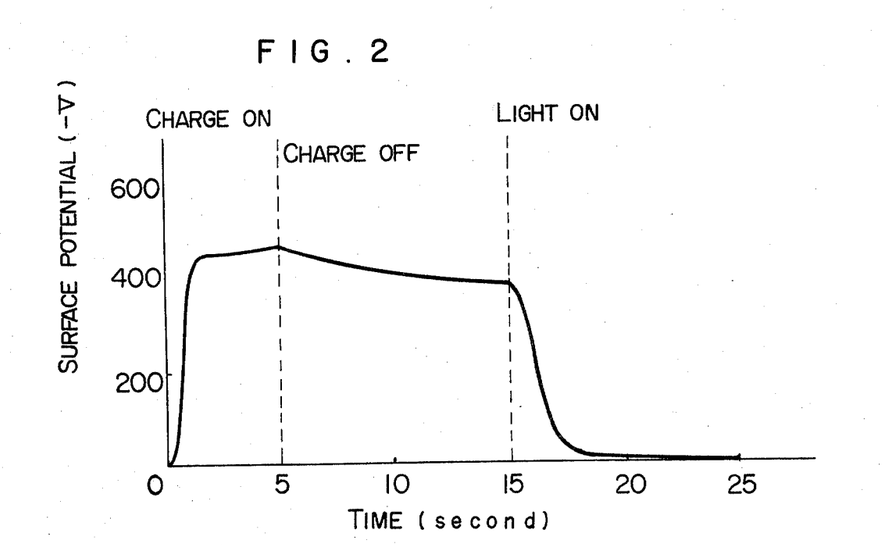
FIG. 2 shows a similar curve for another example of this invention, and FIG. 3 also shows a similar curve for still another example of this invention.

The photosensitive material obtained above is tested for its surface charge and charge decay characteristics in a manner similar to that in Example 1 to obtain a surface charge and charge decay characteristic curve as shown in FIG. 2. The said photosensitive material shows an initial potential, $V_0$, of −470 V, a percentage residual potential, $V_{10}/V_0$ (dark decay), of 95 percent, and a light decay, $E_{20}$, of 3.0 seconds. The surface charge and charge decay characteristics are extremely favorable. The moisture resistance and stability against pre-exposure are also good. The image-forming characteristics are favorable, particularly in the sharpness of the image without fogging and in the reproducibility of gradation of the half-tone.

For comparison, in a manner similar to that in Example 1, the resin solution (B) is mixed with a zinc oxide powder and the resulting mixture is coated on a paper, which has been made conductive, to obtain a photosensitive material for electrophotography. This material is tested for its surface charge and charge decay characteristics to obtain the following results: initial potential, $V_0$, −190 V; percentage residual potential, $V_{10}/V_0$ (dark decay), 45 percent; light decay, $E_{20}$, 8.0 seconds. These results are inferior to those in the case of this invention, The moisture resistance and stability against pre-exposure are also inferior.

EXAMPLE 9

To 113 parts of xylene, which has been placed in a polymerizer and heated to 100°C., is added dropwise over a period of 5 hours a mixture comprising 69.3 parts of styrene, 43.5 parts of 2-hydroxyethyl methacrylate, 1.5 parts of benzoyl peroxide, and 2 parts of n-dodecyl mercaptan. The mixture is further heated at 100°C. for 2 hours. The reaction mixture is freed from the solvent by distillation under reduced pressure and the residue is further dried at 130°C. under a pressure of 1.3 mmHg.

The copolymer thus obtained has a hydroxyl value of 106 and a mean molecular weight of about 3,500. 100 Parts of said copolymer, 21.4 parts of maleic anhydride, 0.1 part of triethylamine, and 122 parts of xylene are mixed and the mixture is allowed to undergo addition reaction at 100°C. with stirring for 5 hours. The addition reaction product thus obtained has an acid value of 127 and contains 15.2 percent of the structural unit [Z].

2 Parts of the above addition reaction product and 38 parts of the resin solution (B) obtained in Example 8 are mixed (content of the structural unit [Z] is 0.80 percent). In a manner similar to that in Example 1, said mixture is mixed with a zinc oxide powder and the resulting mixed composition is coated on a paper, which has been made conductive, to obtain a photosensitive material for electrophotography.

The said photosensitive material is tested for its surface charge and charge decay characteristics to obtain the following results: initial potential, $V_0$, −430 V; percentage residual potential, $V_{10}V_0$, (dark decay), 90 percent; light decay, $E_{20}$, 3.0 seconds. These results show excellent characteristics. The image-forming characteristics, moisture resistance, and stability against pre-exposure are also favorable.

EXAMPLE 10

To 100 parts of xylene, which has been placed in a polymerizer and heated to 100°C., is added dropwise over a period of 5 hours a mixture comprising 80 parts of vinyltoluene, 20 parts of hydroxypropyl methacrylate, 2 parts of n-dodecyl mercaptan, and 1.5 parts of benzoyl peroxide. The mixture is further heated at 100°C. for 2 hours. The polymer solution obtained is evaporated to dryness in a manner similar to that in Example 9. The polymer obtained has a mean molecular weight of 4,200 and a hydroxyl value of 39.

100 Parts of the above-obtained polymer, 9.6 parts of phthalic anhydride, 0.1 part of triethylamine, and 100 parts of xylene are mixed and the mixture is heated at 100°C. for 5 hours to obtain a resin solution. The resin has an acid value of 33 and conversion in the above addition reaction is nearly 100 percent. The content of the structural unit [Z] is 8.6 percent.

4 Parts of the resin solution obtained from the above addition reaction and 36 parts of the resin solution (B) obtained in Example 8 (the content of the structural unit [Z] is 8.6 percent) are mixed with each other and then with a zinc oxide powder in a manner similar to that in Example 1, and the resulting mixture is then coated on a paper, which has been made conductive, to obtain a photosensitive material for electrophotography.

The resulting photosensitive material is tested for its surface charge and charge decay characteristics to obtain the following results: initial potential, $V_0$, −450 V; percentage residual potential, $V_{10}/V_0$ (dark decay), 86 percent; light decay, $E_{20}$, 3.5 seconds. Therefore, the surface charge and charge decay characteristics of the material are excellent. The imageforming characteristics, moisture resistance, and stability against pre-exposure are also favorable.

EXAMPLE 11

48 Parts of a monomer of the formula, 40 parts of styrene, 12 parts of n-butyl methacrylate, 78 parts of toluene, 20 parts of isopropyl alcohol, and 3 parts of azobisisobutyronitrile are mixed and the mixture is polymerized at 80°C. for 8 hours to obtain a resin solution (C) containing 50.5 percent of non-volatile solid content. The resin has a mean molecular weight of about 12,000 and an acid value of 48, and the content of the structural unit [Z] is 11.5 percent.

2.5 Parts of the above-obtained resin solution (C) and 37.5 parts of the resin solution (B) obtained in Example 8 are mixed (content of the structural unit [Z] is 0.72 percent) and the mixture is admixed with a zinc oxide powder in a manner similar to that in Example 1. The resulting composition is coated on a paper, which has been made conductive, to obtain a photosensitive material for electrophotography.

The said photosensitive material is tested for its surface charge and charge decay characteristics to obtain the following results: initial potential, $V_0$, −470 V; percentage residual potential, $V_{10}/V_0$ (dark decay), 92 percent, light decay, $E_{20}$, 5.5 seconds. Therefore, the surface charge and charge decay characteristics are excellent.

The image-forming characteristics are also favorable and a sharp image without fogging is formed.

EXAMPLE 12

100 Parts of xylene and 5.5 parts of mercaptoethanol are charged into a reactor. After the air in the reactor has been replaced with carbon dioxide, the temperature of the contents is brought to 120°C. 128 Parts of n-butyl methacrylate, 24 parts of methyl methacrylate, 8 parts of 2-hydroxyethyl methacrylate, and 200 parts of xylene are mixed and the mixture is added to the reactor. Then, a mixture comprising 20 parts of a 75 percent-benzene solution of tert-butyl peracetate and 200 parts of xylene is added to the reactor dropwise over a period of 5 hours. The contents of the reactor is maintained at 120°C. for further 1 hour. In a manner similar to that in Example 9, the reaction mixture is freed from the solvent by distillation under reduced pressure to dryness. The resulting polymer containing a hydroxy group shows a viscous consistency and has a mean molecular weight of about 2,900, a glass transition temperature of about 35°C., and a hydroxyl value of 20.

100 Parts of the above polymer, 5.4 parts of phthalic anhydride, 105.4 parts of xylene, and 0.2 part of ethylamine are mixed. The mixture is heated with stirring at 100°C. for 5 hours to undergo addition reaction and to yield a resin solution (C). Conversion in the addition reaction is 98.7 percent. The solution of the reaction product thus obtained is a yellow, transparent and viscous liquid having an acid value of 10.0. The resin contains 5.05 percent of the structural unit [Z].

A mixed solution containing 40 parts of the above-obtained addition-reaction solution, 1 part of methanol, 0.03 part of Rose Bengal, and 300 parts of toluene is mixed with 100 parts of a zinc oxide powder in a ball mill for 4 hours. The resulting resin composition is coated on a paper, which has been made conductive, to obtain a photosensitive material for electrophotography.

The said photosensitive material is tested for its surface charge and charge decay characteristics to obtain the following results: initial potential, $V_0$, −470 V; percentage residual potential, $V_{10}/V_0$ (dark decay), 87 percent, light decay, $E_{20}$, 4.0 seconds. Therefore, the surface charge and charge decay characteristics are extremely favorable. The image-forming characteristics of the material are also favorable so that a sharp image without fogging can be formed. The moisture resistance and the stability against pre-exposure are also favorable.

150 Parts of xylene, 5.5 parts of mercaptoethanol, 128 parts of n-butyl methacrylate, 24 parts of methyl methacrylate, 4 parts of acrylic acid, and 20 parts of tert-butyl peracetate (75 percent benzene solution) are mixed in a reactor and the mixture is polymerized, in a manner similar to that mentioned above, to obtain a resin solution. The resin has a mean molecular weight of about 3,000 and an acid value of 19.5.

The above resin solution and a zinc oxide powder are mixed in a manner similar to that mentioned in Example 1 and the resulting composition is coated on a paper, which has been made conductive, to obtain an electrophotographic recording material. This recording material is tested for its surface charge and charge decay characteristics to obtain the following results: initial potential, $V_0$, −250 V; percentage residual potential, $V_{10}/V_0$ (dark decay), 40 percent; light decay, $E_{20}$, 6.5 sec. Therefore, the surface charge and charge decay characteristics are inferior to those of the present material. In the image-forming test, a fairly sharp image is obtained but the density of the image is low and even accompanied by a fog phenomenon. The moisture resistance and stability against pre-exposure are also insufficient.

EXAMPLE 13

32 Parts of n-butyl acrylate, 64 parts of methyl methacrylate, 4 parts of 2-hydroxypropyl methacrylate, 3.0 parts of n-dodecyl mercaptan, 2.0 parts of a 75 percent-benzene solution of tert-butyl peracetate, and 500 parts of xylene are polymerized in a manner similar to that in Example 12 to obtain a resin solution. The resin solution is freed from the solvent by distillation in a manner similar to that in Example 12. The polymer thus obtained is a pale yellow viscous substance having a mean molecular weight of about 1450, a glass transition temperature of 30°C., and a hydroxy value of 15.

100 Parts of the above polymer, 3.1 parts of maleic anhydride, 0.3 part of triethylamine, and 103 parts of xylene are mixed and the mixture is allowed to undergo addition reaction in a manner similar to that in Example 12 to obtain a resin solution. The resin has an acid value of 7.5 and contains 2.9 percent of the structural unit [Z].

The above-obtained resin solution, a zinc oxide powder, and sensitizing dyes are mixed in a manner similar to that in Example 1 and the resulting composition is coated on a paper, which has been made conductive, so that the film thickness of the photoconductive layer is 11 $\mu$ to obtain a photosensitive material for electrophotography.

The said photosensitive material is tested for its surface charge and charge decay characteristics to obtain the following results: initial potential, $V_0$, −395 V; percentage residual potential, $V_{10}/V_0$ (dark decay), 83 percent; light decay, $E_{20}$, 4.0 sec. Therefor the surface charge and charge decay characteristics of this material is extremely favorable. The image-forming characteristics, moisture resistance, and stability against pre-exposure are also favorable.

EXAMPLE 14

60 Parts of n-butyl methacrylate, 20 parts of methyl methacrylate, 20 parts of hydroxypropyl methacrylate, 3.5 parts of n-dodecyl mercaptan, 2.5 parts of benzoyl peroxide, and 500 parts of xylene are polymerized in a manner similar to that in Example 12 and then freed from the solvent by distillation under reduced pressure to obtain a hydroxyl-containing polymer. The polymer has a mean molecular weight of about 1,200, a glass transition temperature of about 35°C. and a hydroxyl value of 78.

100 Parts of the above polymer, 20.6 parts of phthalic anhydride, 0.6 part of triethylamine, and 120.6 parts of toluene are mixed and the mixture is allowed to undergo addition reaction in a manner similar to that in Example 12 to obtain a resin solution (D) of an acid value of 34. The resin contains 16.5 percent of the structural unit [Z].

4 Parts of the above resin solution and 36 parts of the resin solution (B) obtained in Example 8 are mixed (content of the structural unit [Z] is 1.65 percent) and then admixed with a zinc oxide powder in a manner similar to that in Example 1 to obtain a resin composition. The resin composition thus obtained is coated on a paper, which has been made conductive, in a manner similar to that in Example 1 to obtain a photosensitive material for electrophotography. Upon examination of the surface charge and charge decay characteristics, said photosensitive material is found to have the following favorable characteristics: an initial potential, $V_0$, of $-470$ V, a percentage residual potential, $V_{10}/V_0$ (dark decay), of 88 percent, and a light decay, $E_{20}$, of 5.5 seconds. The image-forming characteristics, moisture resistance, and stability against pre-exposure are also favorable.

EXAMPLE 15

100 Parts of the hydroxyl-containing polymer obtained in Example 12, a polybasic carboxylic acid anhydride shown in Table 2 (in an amount as shown in Table 2), 105 parts of xylene, and 0.2 part of triethylamine are mixed and the mixture is allowed to react at 100°C. for 5 hours. In this way, the resin solutions (C), (D), (E) and (F) are obtained. Each of these resin solutions, a photoconductive zinc oxide powder, and a sensitizing dye, which is the same as in Example 1, are mixed in a manner similar to that in Example 1. The resulting mixtures are each coated on a paper, which has been made conductive, to obtain photosensitive materials for electrophotography (Nos. 1, 2, 3 and 4 in Table 2) which are tested for their surface charge and charge decay characteristics, image-forming characteristics, moisture resistance, and stability against pre-exposure. The results obtained are shown in Table 2.

methacrylate, 10.1 parts of methyl 2-hydroxyethyl maleate, and 200 parts of xylene are polymerized in a manner similar to that in Example 12 to obtain a hydroxyl-containing polymer. The polymer has a mean molecular weight of about 3,000, a glass transition temperature of 39°C., and a hydroxyl value of 19.

100 Parts of the above polymer, 5.3 parts of phthalic anhydride, 0.2 part of triethylamine, and 105.3 parts of xylene are mixed and the mixture is allowed to undergo addition reaction in a manner similar to that in Example 12 to obtain a resin solution. The resin has an acid value of 9.8 and contains 4.85 percent of the structural unit [Z].

The above resin solution and a photoconductive zinc oxide powder are mixed in a manner similar to that in Example 1 and the mixture is coated on a paper, which has been made conductive, to obtain a photosensitive material for electrophotography. This photosensitive material has favorable surface charge and charge decay characteristics, moisture resistance, image-forming characteristics, and stability against pre-exposure.

A photosensitive material for electrophotography is obtained in the same manner as that mentioned above, except that 10.1 parts of 2-hydroxyethyl itaconate is used in place of methyl 2-hydroxyethyl maleate. This photosensitive material has favorable surface charge and charge decay characteristics, moisture resistance, image-forming characteristics, and stability against pre-exposure.

EXAMPLE 17

38 Parts of 50 percent-xylene solution of styrenated alkyd resin ("Styresol J-719," produced by Dainippon Ink and Chemicals, Inc.) and 2 parts of the resin solution (C) obtained in Example 12 are mixed and the mixture is further mixed with a photoconductive zinc oxide powder in a manner similar to that mentioned in Example 1. The resulting resin solution is coated on a paper, which has been made conductive, to obtain a photosensitive material for electrophotography. Upon examination of the surface charge and charge decay characteristics, the said photosensitive material shows the following favorable characteristics: an initial potential, $V_0$, of $-550$ V; a percentage residual potential, $V_{10}/V_0$ (dark decay), of 90 percent; a light decay, $E_{20}$, of 9.0 sec. The said photosensitive material has also favorable image-forming characteristics, moisture resistance, and stability against pre-exposure.

For comparison, the above-said styrenated alkyd

Table 2

| No. | Acid anhydride (part) | Amount of structural unit [I] contained in resin, % | Surface charge and charge decay characteristics | | | Image-forming | Moisture resistance | Stability against pre-exposure |
|---|---|---|---|---|---|---|---|---|
| | | | Initial potential, $V_0$, V | Residual potential, $V_{10}/V_0$, % | Light decay, $E_{20}$, sec. | | | |
| 1 | Trimellitic anhydride (7) | 6.5 | $-470$ | 85 | 6.5 | good | good | good |
| 2 | Naphthalic anhydride (7.2) | 6.6 | $-450$ | 82 | 6.0 | good | good | good |
| 3 | Tetrahydrophthalic anhydride (5.5) | 5.2 | $-410$ | 80 | 6.0 | good | good | good |
| 4 | Diphenic anhydride (8.2) | 7.5 | $-430$ | 80 | 6.5 | good | good | good |

EXAMPLE 16

100 Parts of xylene, 5.5 parts of mercaptoethanol, 128 parts of n-butyl methacrylate, 24 parts of methyl resin is mixed with a photoconductive zinc oxide powder and the resulting composition is coated on a paper, which has been made conductive, to produce a photosensitive material for electrophotography. Upon examination of the surface charge and charge decay characteristics, the said photosensitive material shows the following favorable characteristics: an initial potential, $V_0$, of -500 V; a percentage residual potential, $V_{10}/V_0$ (dark decay), of 88 percent; a light decay, $E_{20}$, of 5.0 sec. The image-forming characteristics are also good. However, the stability against pre-exposure is poor; an image formed on the said photosensitive material which has been pre-exposed is of markedly decreased density.

EXAMPLE 18

12.2 Parts of a monomer represented by the formula,

74.7 parts of methyl methacrylate, 324.6 parts of n-butyl methacrylate, 10 parts of azobisisobutyronitrile, and 600 parts of toluene are polymerized at 80°C. for 8 hours to obtain a resin solution containing 39.8 percent of non-volatile solid content. The resin has a mean molecular weight of about 12,000 and contains 2.25 percent of the structural unit [Z].

36.0 Parts of the above-obtained resin solution and 3.2 parts of the resin solution (D) obtained in Example 14 are mixed {content of the structural unit [Z] is 2.65 percent} and the resulting resin mixture is mixed with a photoconductive zinc oxide powder in a manner similar to that in Example 1. The resulting composition is coated on a paper, which has been made conductive, to produce a photosensitive material for electrophotography.

Upon examination of its surface charge and charge decay characteristics, the said photosensitive material for electrophotography shows the following favorable characteristics: an initial potential, $V_0$, of -490 V; a percentage residual potential, $V_{10}/V_0$ (dark decay), of 95 percent; a light decay, $E_{20}$, of 5.0 sec. The said photosensitive material has also favorable image-forming characteristics, moisture resistance, and stability against pre-exposure.

EXAMPLE 19

12 Parts of methyl methacrylate, 72 parts of n-butyl methacrylate, 2 parts of a 50 percent-toluene solution (hereinafter referred to as a monomer solution M) of a vinyl monomer represented by the formula 1015.5 parts of toluene, 7.5 parts of isopropyl alcohol, and 1.0 parts of azobisisobutyronitrile are mixed and the mixture is polymerized at 80°C. To the reaction mixture, when conversion reached 90 percent, is added dropwise over a period of 2.5 hours a mixture comprising 7 parts of methyl methacrylate, 3 parts of n-butyl methacrylate, 10 parts of the above-said monomer solution M, 15 parts of toluene, 1.5 parts of n-dodecyl mercaptan, and 0.5 part of azobisisobutyronitrile. Polymerization is continued at 80°C. for further 4 hours. At the completion of polymerization, 20 parts of toluene is added to the reaction mixture to obtain a resin solution. On analysis, this resin solution is found to contain, as two major components, a polymer having a mean molecular weight of about 15,000 and containing 1.2 percent of the structural unit [Z] and a polymer having a mean molecular weight of about 4,000 and containing 33.4 percent of the structural unit [Z]. The resin solution contains 6.8 percent of the structural unit [Z] and 39.9 percent of non-volatile solid content. It has an acid value of 4.0.

The above-said resin solution, a photoconductive powder and a sensitizing dye are mixed in a manner similar to that in Example 1, and the mixture is coated on a paper, which has been made conductive, to obtain a photosensitive material for electrophotography.

Figure 3:
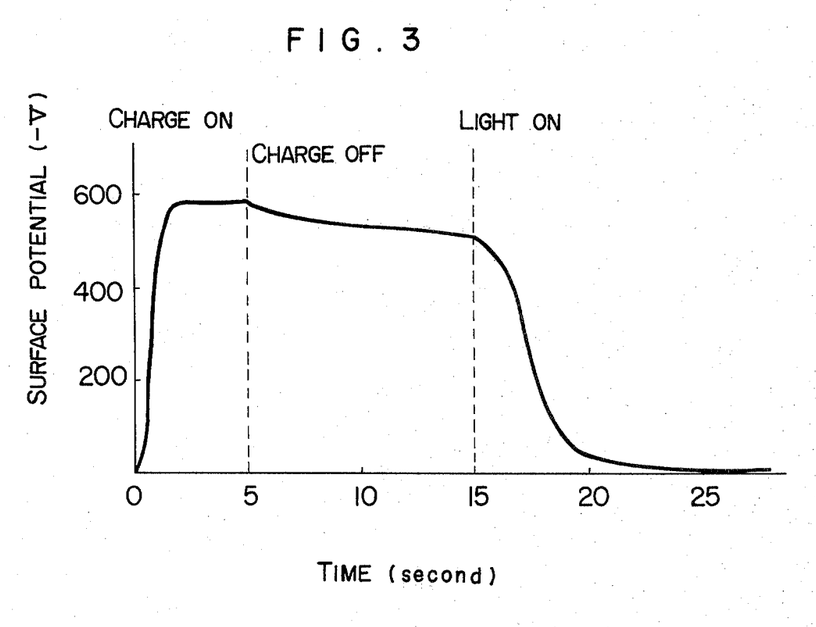

The photosensitive material thus obtained is tested for its surface charge and charge decay characteristics in a manner similar to that in Example 1 and the results obtained are shown in FIG. 3. It shows particularly excellent characteristics: an initial potential, $V_0$, of -590 V; a percentage residual potential, $V_{10}/V_0$ (dark decay) of 87 percent; and a light decay, $E_{20}$, of 6.5 sec. Further, the said photosensitive material is tested for its image-forming characteristics. It is found that the said photosensitive material is able to form an extremely clear image; density of the image and reproducibility of the half-tone are both desirable; moisture resistance and stability against pre-exposure are also good.

EXAMPLE 20

250 Parts of the resin solution obtained in Example 1 and 0.1 part of phthalic anhydride are mixed and the mixture is further mixed with a photoconductive zinc oxide powder in a manner similar to that in Example 1. The resulting composition is coated on a paper, which has been made conductive, to obtain a photosensitive material for electrophotography. This photosensitive material is tested for its surface charge and charge decay characteristics to obtain the following favorable results: initial potential, $V_0$, -500 V; percentage residual potential, $V_{10}/V_0$ (dark decay), 85 percent; light decay, $E_{20}$, 6.0 sec. The material is tested for its image-forming characteristics and improvement in density of the image is confirmed.

What is claimed is:

1. A photosensitive material for electrophotography comprising an electrically conductive substrate material and a photoconductive layer provided thereon, characterized in that said photoconductive layer is formed from a resin composition consisting essentially of:
   a. a photoconductive powder, and
   b. a binder which comprises a mixture of
      1. polymer [A] having a glass transition temperature of -20° to 100°C, and a mean molecular weight $MW_1$, of $500 \leq MS \leq 5000$; and containing a structural unit represented by the following formulas [I] or [II], the $-OOCR_3COOH$ content in said formulas being 0.5-90 percent by weight, based on the weight of polymer [A]:

or wherein $R_1$ is hydrogen or methyl, $R_2$ is an alkylene radical of 2–8 carbon atoms, a polyethylene glycol residue having 10 or less recurring units or a polypropylene glycol residue having 10 or less recurring units, and $R_3$ is wherein $R_4$ and $R_5$ are hydrogen or alkyl of 1–4 carbon atoms, or and in a major amount 2. polymer [B] having a glass transition temperature of 0 to 60°C and a mean molecular weight $MW_2$ of $5000 \leq MW_2 \leq 50{,}000$ and greater than that of $MW_1$; and containing 60 percent by weight or less of structural units represented by said formulas [I] or [II] and at least 30 percent by weight of the structural units being represented by the following formula [III]:

[III]

where $R_1$ is the same as defined above and $R_6$ is straight or branched chain alkyl of 1–12 carbon atoms, cycloalkyl or benzyl
said binder containing 0.5–60 percent by weight of $-OOCR_3COOH$.

2. A photosensitive material for electrophotography according to claim 1, wherein the binder is a polymer composition comprising a polymer [A] which has a mean molecular weight of 500 to 5,000 and whose main chain is composed of a copolymer of styrene and allyl alcohol, and which has a $-OOCR_3 COOH$ content of 0.5 to 90 percent by weight, said content being represented by the formula [II], and a polymer [B] which has a mean molecular weight of 5,000 to 50,000 and which has a $-OOC CR_3 COOH$ content of 60 percent by weight or less.

3. A photosensitive material for electrophotography according to claim 1, wherein the binder is a resin composition comprising a polymer [A] of a mean molecular weight of 500 to 5,000 which contains at least 30 percent by weight of a structural unit [III] and has a $-OOCR_3COOH$ content of 0.5 to 90 percent by weight, said content being represented by the formula [I], and a polymer [B] of a mean molecular weight of 5,000 to 50,000 which has a $-OOCR_3COOH$ content of 60 percent by weight or less, said content being represented by the formula [I], and also containing at least 30 percent by weight of a structural unit [III]; said resin composition being obtained from a vinyl monomer $M_1$ which has the formula and another vinyl monomer $M_2$ which is copolymerizable with $M_1$, in such a manner that at first 10 to 30 percent by weight of the total $M_1$ monomer and 70 to 90 percent by weight of the total $M_2$ monomer are allowed to copolymerize, and when the conversion exceeds 50 percent, the remaining $M_1$ and $M_2$ monomers are added to continue the polymerization until completion.

4. A photosensitive material for electrophotography according to claim 3, wherein the resin composition for use as the binder is prepared by using as the monomer $M_1$ at least one of the compounds of the following formulas:

and wherein $R_4$ and $R_6$ have the same meanings as defined above.

* * * * *